United States Patent [19]
Makinsky et al.

[11] 3,883,400
[45] May 13, 1975

[54] SYSTEM FOR THERMAL DESALTING OF WATER

[76] Inventors: Ismail Zelfugarovich Makinsky, ulitsa E. Saratovtsa, 3/5, kv. 8; Enver Akhmedogly Kasimzade, ulitsa E. Saratovtsa, 5, kv. 21; Samuil Petrovich Baksht, ulitsa Nizami 129 kv. 13, all of Baku, U.S.S.R.

[22] Filed: Jan. 10, 1974

[21] Appl. No.: 432,156

Related U.S. Application Data

[63] Continuation of Ser. No. 311,643, Dec. 4, 1972, abandoned, which is a continuation of Ser. No. 117,982, Feb. 23, 1971, abandoned.

[52] U.S. Cl. ............... 202/180; 202/235; 202/205; 203/11; 203/88; 203/22
[51] Int. Cl. ........................... B01d 3/06; B01d 3/10
[58] Field of Search 159/2, 2 MS, 3, 24 B, DIG. 18; 202/176, 177, 235, 180, 173, 174, 202, 205; 203/10, 11, 88, DIG. 4, DIG. 14, 21–27, DIG. 20, DIG. 17; 122/1 G, 35; 60/648

[56] References Cited
UNITED STATES PATENTS

| | | | |
|---|---|---|---|
| 2,025,724 | 12/1935 | Clendenin | 203/88 |
| 2,759,882 | 8/1956 | Worthen et al. | 203/11 |
| 3,219,552 | 11/1955 | Starmer et al. | 202/173 |
| 3,243,359 | 3/1966 | Schmidt | 202/174 |
| 3,412,558 | 11/1968 | Starmer | 60/648 |
| 3,438,202 | 4/1969 | Roe | 60/648 |
| 3,489,652 | 1/1970 | Williamson | 203/11 |
| 3,514,375 | 5/1970 | Dambrine | 202/173 |

*Primary Examiner*—Norman Yudkoff
*Assistant Examiner*—David Edwards
*Attorney, Agent, or Firm*—Holman & Stern

[57] ABSTRACT

A system for thermal desalting of water in an adiabatic evaporator with condensation of the secondary steam is characterized in that it includes a steam turbine with a condenser which is connected through pipelines with an adiabatic evaporator and a water-to-water heat exchanger forming a circulation water cooling system.

2 Claims, 1 Drawing Figure

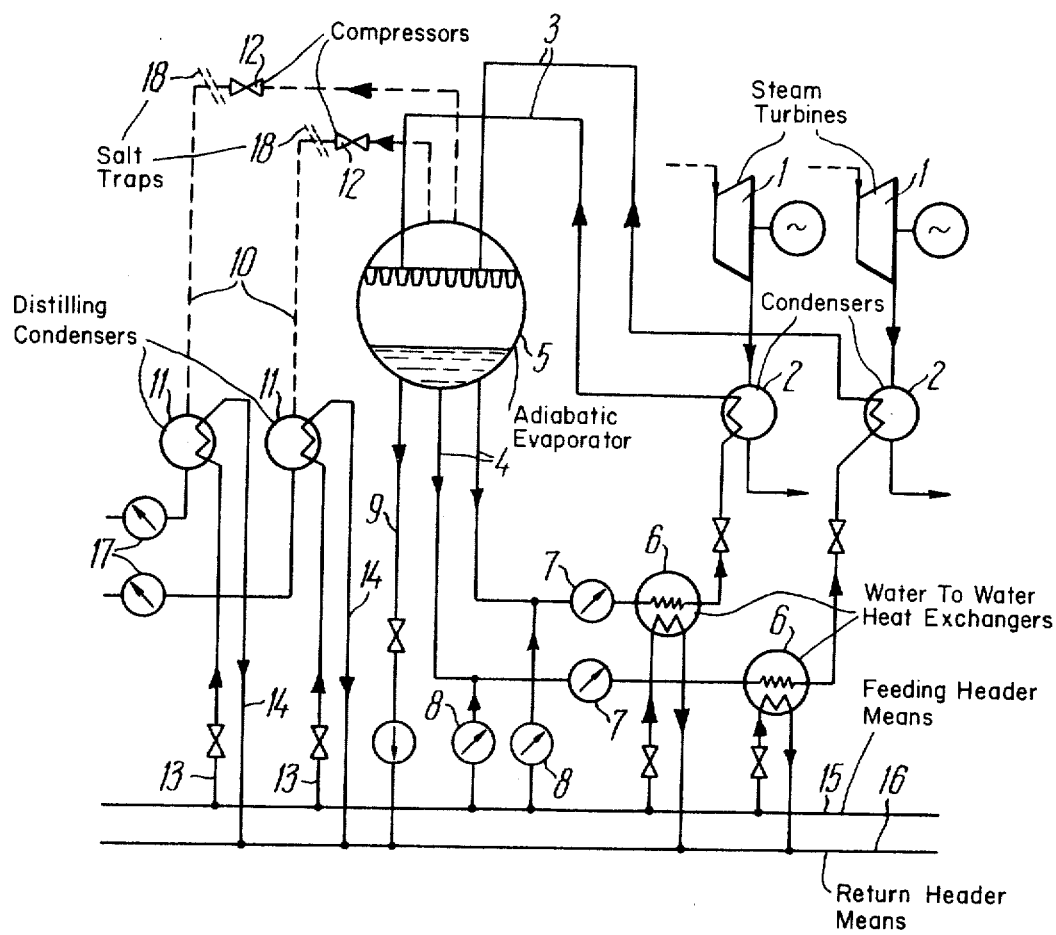

SYSTEM FOR THERMAL DESALTING OF WATER

This is a continuation of application Ser. No. 311,643, filed Dec. 4, 1972, which in turn is a continuation under Rule 60 of application Ser. No. 117,982 filed Feb. 23, 1971, and both now abandoned.

BACKGROUND OF THE INVENTION

The present invention relates to arrangements for producing demineralized water, for example, from sea water and, more particularly, the invention relates to systems for thermal desalting of water.

Electric power stations usually employ systems for thermal desalting of water in an adiabatic evaporator where secondary steam is condensed in a distilling condenser mounted in a steam turbine unit. In these systems the steam taken off from the intermediate stages of the turbine is used for the evaporation, while the starting water for feeding the evaporator is preliminarily softened through chemical treatment or by means of ion exchange, for which purpose the water is passed through several stages of cathionic or anionic filters.

The known systems for producing desalted water feature a number of significant disadvantages; the starting water has to be subjected to preliminary treatment because the process of evaporation at a temperature higher than 45°C is associated with formation of scale; the use of steam taken off from the turbine, which otherwise could be used for producing electric power; the high cost of the desalted water; the presence of a special water-to-water heat exchanger for heating the starting water; the whole system for desalting water is bulky and expensive.

SUMMARY OF THE INVENTION

An object of the present invention is to eliminate the above-mentioned disadvantages.

The specific object of the invention is to develope a system for thermal desalting of water having simple construction and providing for a low cost of the desalted water due to the use of low-potential heat of exhaust steam of a turbine without reducing the turbine efficiency.

This object is attained due to the fact that in a system for thermal desalting of water the turbine condenser is connected through a pipeline in series with an evaporator and a water-to-water heat exchanger for forming a recirculation water cooling system.

The pipeline used for removing the secondary steam from the evaporator is preferably provided with a compressor, for example, mechanical or thermal compressor.

The proposed system for thermal desalting of water reduces the prime cost of a distillate by a factor of 5 to 6, reduces the cost of the unit by a factor of 2 to 3 and does not require preliminary softening of the water since the distillation is effected under a high vacuum.

The consumption of thermal and electric power per ton of distillate produced is equal to 0.027 Mcal/t against 0.733 Mcal/t for single-store units and 0.067 Mcal/t for 12-stage units.

The process of distillation is continuous and this simplifies the operation and automation of the system for thermal desalting of water, furthermore, in this case it is possible to produce a high-quality distillate due to a negligible consumption of water in the process of evaporation at a temperature drop in the evaporator of 5°-6°C.

The system allows one to effect thermal compensation of the secondary steam prior to its condensation for a better utilization of a low-potential heat of the exhaust steam of the turbine without deteriorating its efficiency.

BRIEF DESCRIPTION OF THE DRAWING

The invention is further described by way of example with reference to the accompanying drawing which illustrates a schematic diagram of a system for thermal desalting of water.

DETAILED DESCRIPTION OF THE PREFERRED EMBODIMENT

Referring now to the drawing, the system for thermal desalting of water comprises two steam turbines 1 with condensers 2 which through pipelines 3 and 4 are connected with an adiabatic evaporator 5 and with water-to-water heat exchangers 6 forming a cirulation water cooling system. The water is forced through this system by pumps 7. The circulation system is fed with water through pumps 8, while the blowing is effected through the pipeline 9. The steam space of the adiabatic evaporator 5 is connected to distillating condensers 11 via pipelines 10. The latter are provided with compressors 12 which are made in the form of mechanical ventilators or steam ejectors.

The condensers 11 are cooled by water through pipelines 13 and 14 from collectors 15 and 16. The distillate is fed into the main network by means of pumps 17.

The system of thermal desalting of water operates as follows.

The exhaust steam of the turbine 1, when condensed, heats the cooled water in the condenser 2. This water is pumped to the adiabatic evaporator 5 through the pipeline 3. In the evaporator 5 there is maintained such a vacuum that the temperature of evaporation is 5° to 6°C lower than the temperature of the heated circulation water for evaporation of approximately 1/100 + 1/120 portion of the circulation water. The evaporated water is withdrawn from the adiabatic evaporator 5 by the circulating pump 7 and is fed through the water-to-water heat exchanger 6 and through the pipelines 4 to the condenser 2 of the turbine 1.

In this case the circulation water passing through the return circuit (condenser 2 - adiabatic evaporator 5 - heat exchanger 6) is heated in the heat exchanger 6 to the initial temperature due to the supply of the straight-flow cooling water from the collector 15 into the heat exchanger 6 and due to discharging the water from the collector 15 into the collector 16.

The secondary steam washed with streams of distillate is fed from the adiabatic evaporator 5 into the louver separator of the adiabatic evaporator 5 for separation. After that, the secondary steam with the help of the compressor 12 is subjected to thermocompression and is fed into a louver or another salt trap 18 for secondary demineralization and then is fed into the distilling condenser 11. This condenser 11 is cooled down by the straight-flow water fed through the pipeline 13 from the collector 15 and through the pipeline 14 into the collector 16. The distillate produced in the condenser 11 is fed into the cycle of the power station.

The compression of the secondary steam is necessary during the summer period of operation of the system when the cooling water has a high temperature and the turbine 1 operates under a low vacuum.

The desalting system by means of a pump 8 is fed with water from the collector 15 through mechanical filters. The continuous blowing of the adiabatic evaporator 3 is effected through a pipeline in the collector 16.

We claim:

1. A system for thermal desalting of water comprising in combination:

feeding and return header means for distributing cooling water in pipelines of the system;

at least one steam turbine having an exhaust for exhausting steam therefrom;

condenser means connected to the exhaust of said steam turbine through a pipeline;

an adiabatic evaporator having an inlet side and a first and second outlet side, said adiabatic evaporator having its inlet side connected to said condenser means through a pipeline;

water-to-water heat exchanger means having a first, second and separate third side, the first side being connected to the first outlet side of said adiabatic evaporator through a pipeline, said second side being connected to said condenser means, the third side being connected to said feeding and return header means for distributing cooling water so that fluid flowing through said heat exchanger means from said first side to said second side is brought to the temperature of the cooling water in said distributing means;

said water-to-water heat exchanger means, said condenser means and said adiabatic evaporator forming a circulation water cooling system;

distilling condenser means connected through a pipeline to the second outlet side of said adiabatic evaporator for receiving steam therefrom, said distilling condenser means being connected to said feeding and return header means for distributing cooling water so that said condenser means is indirectly cooled thereby said distilling condenser means is cooled thereby.

2. A system as claimed in claim 1, wherein a compressor is disposed in the pipeline connecting said distilling condenser means to said second outlet side of said adiabatic evaporator.

* * * * *